(12) United States Patent
Yeh

(10) Patent No.: US 9,160,204 B2
(45) Date of Patent: Oct. 13, 2015

(54) BIDIRECTIONAL WIRELESS POWER TRANSFER DEVICE

(76) Inventor: Ming-Hsiang Yeh, Taipei (TW)

( * ) Notice: Subject to any disclaimer, the term of this patent is extended or adjusted under 35 U.S.C. 154(b) by 629 days.

(21) Appl. No.: 13/609,610

(22) Filed: Sep. 11, 2012

(65) Prior Publication Data

US 2014/0070620 A1    Mar. 13, 2014

(51) Int. Cl.
*H01F 27/42* (2006.01)
*H01F 37/00* (2006.01)
*H01F 38/00* (2006.01)
*H02J 17/00* (2006.01)
*H02J 5/00* (2006.01)
*H02J 7/02* (2006.01)

(52) U.S. Cl.
CPC .............. *H02J 17/00* (2013.01); *H02J 5/005* (2013.01); *H02J 7/025* (2013.01)

(58) Field of Classification Search
CPC ............ H02J 5/005; H02J 7/025; H02J 17/00
USPC .......................................................... 307/104
See application file for complete search history.

(56) References Cited

U.S. PATENT DOCUMENTS

2012/0248890 A1* 10/2012 Fukushima ................... 307/104

* cited by examiner

*Primary Examiner* — Carlos Amaya
(74) *Attorney, Agent, or Firm* — Bacon & Thomas, PLLC

(57) ABSTRACT

The present invention relates to a bidirectional wireless power transfer device, which includes: a first transfer unit; a second transfer unit; a selector that includes a first signal terminal, a second signal terminal, and a power input terminal; a power supply unit, which is electrically connected to the power input terminal of the selector and is also electrically connected to the first transfer unit and the second transfer unit; and a circuit board, on which the first transfer unit, the second transfer unit, the selector, and the power supply unit are mounted.

9 Claims, 8 Drawing Sheets

BIDIRECTIONAL WIRELESS POWER TRANSFER DEVICE

FIELD OF THE INVENTION

The present invention relates to a bidirectional wireless power transfer device, which features bidirectional transfer (transmitting and receiving) of electrical power in a wireless manner and realizes wireless power transfer through electrical connection of multiple bidirectional wireless power transfer devices in series and/or in parallel.

BACKGROUND OF THE INVENTION

The upgrading of living standard of modern people and the progress of the society bring handheld devices (such as mobile phones, smart phones, and tablet computers) to the living of urban people. The handheld devices are now more or less a must for the living of urban residents. However, with the fast diversification of functionality, the handheld devices require an increasing consumption of electrical power. To handle such an issue, a portable power supply is available in the market to supply additional electrical power to the handheld devices. To make charging easy and efficient, a wireless charging device is also available. However, such a known wireless charging device only allows charging to be carried out through transfer of electrical power in a uni-directional manner by installing a transmitter in the wireless charging device to transfer electrical power through the transmitter to an electronic device located at a remote site for effecting electrical charging. A drawback of the wireless charging device is that the transfer of electrical power is only one way and does not allow electrical power to be transferred in a bi-directional manner (transmission and receipt). Apparently, further improvement is desired.

In view of such problems, the present invention aims to provide a bidirectional wireless power transfer device, which features wireless transfer of electrical power in a bidirectional fashion (transmitting/receiving) and provides an application of power transfer through wireless series/parallel connection.

SUMMARY OF THE INVENTION

An object of the present invention is to provide a bidirectional wireless power transfer device, which features bidirectional transfer (transmitting and receiving) of electrical power in a wireless manner and realizes wireless power transfer through electrical connection of multiple bidirectional wireless power transfer devices in series and/or in parallel.

To achieve the above object, the present invention provides a bidirectional wireless power transfer device, which comprises: a first transfer unit, which comprises a first signal control terminal and a first power transfer terminal; a second transfer unit, which comprises a second signal control terminal and a second power transfer terminal; a selector, which comprises a first signal terminal, a second signal terminal, and a power input terminal, the first signal terminal being electrically connected to the first transfer unit, the second signal terminal being electrically connected to the second transfer unit; a power supply unit, which is electrically connected to the power input terminal of the selector and is also electrically connected to the first power transfer terminal and the second power transfer terminal; and a circuit board, on which the first transfer unit, the second transfer unit, the selector, and the power supply unit are mounted. As such, bidirectional wireless transfer (transmitting/receiving) of electrical power can be realized and wireless power through electrical connection of multiple bidirectional wireless power transfer devices in series or in parallel can be achieved.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
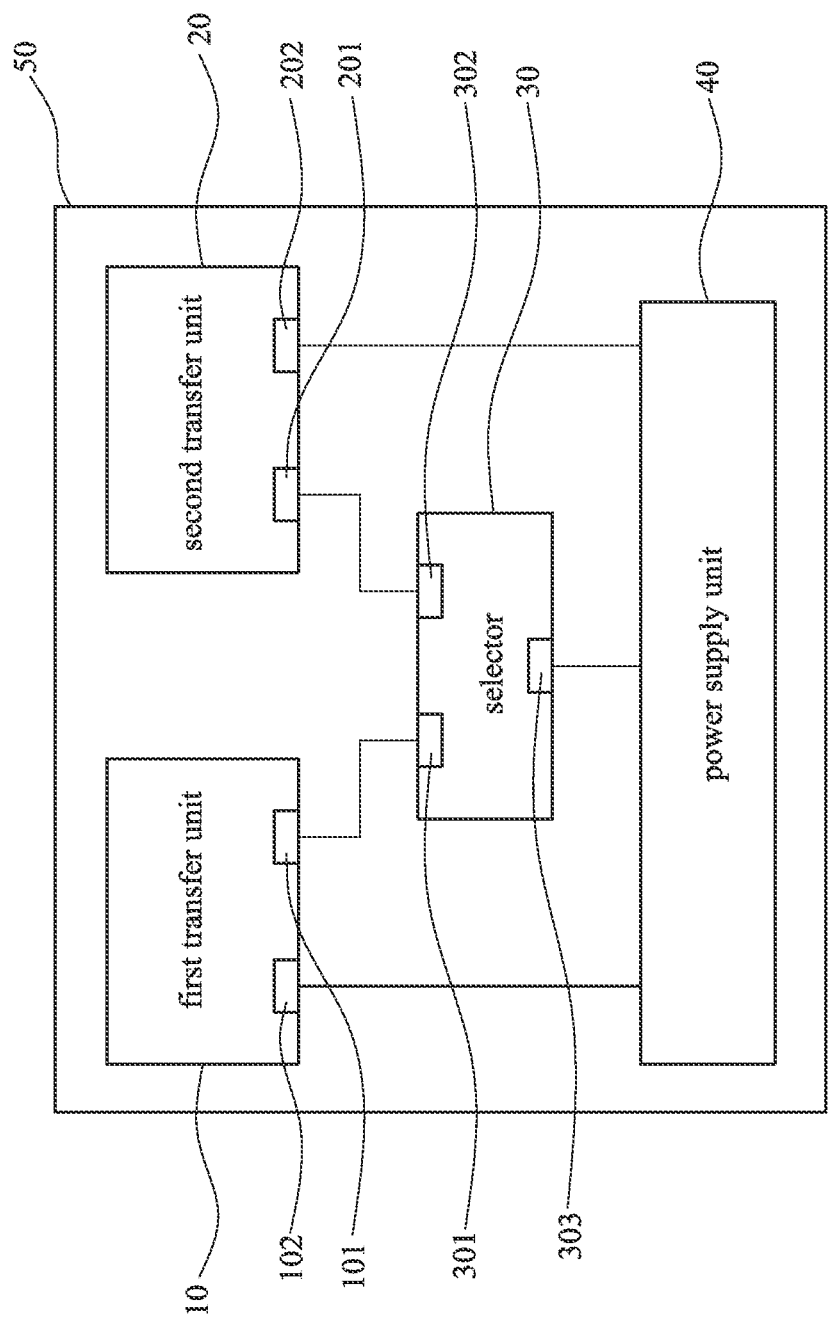
FIG. 1 is a block diagram of a bidirectional wireless power transfer device according to the present invention.

With reference to the drawings and in particular to FIG. 1, which illustrates a block diagram of a bidirectional wireless power transfer device according to the present invention, the bidirectional wireless power transfer device comprises: a first transfer unit 10, which comprises a first signal control terminal 101 and a first power transfer terminal 102; a second transfer unit 20, which comprises a second signal control terminal 201 and a second power transfer terminal 202; a selector 30, which comprises a first signal terminal 301, a second signal terminal 302, and a power input terminal 303, of which the first signal terminal 301 is electrically connected to the first signal control terminal 101 of the first transfer unit 10 and the second signal terminal 302 is electrically connected to the second signal control terminal 201 of the second transfer unit 20; a power supply unit 40, which is electrically connected to the power input terminal 303 of the selector 30 and is also electrically connected to the first power transfer terminal 102 and the second power transfer terminal 202; and a circuit board 50, on which the first transfer unit 10, the second transfer unit 20, the selector 30, and the power supply unit 40 are formed. The power supply unit 40 can be an electrical cell, which can be an ultras-thin cell, a flexible cell, a nickel-cadmium cell, a nickel hydride cell, or a lithium ion cell. The power supply unit 40 supplies electrical power to the first transfer unit 10 and the second transfer unit 20. With the first transfer unit 10 and the second transfer unit 20, bidirectional wireless transfer (transmitting/receiving) of electrical power can be realized and wireless power through electrical connection of multiple bidirectional wireless power transfer devices in series/in parallel can be achieved.

Referring to FIGS. 2-5, which are block diagrams illustrating four operation conditions of the present invention, reference being also made to FIG. 1, since most of the components of FIGS. 2-5 are identical to those of FIG. 1, repeated description will be omitted herein. The first transfer unit 10 comprises a transmitter 31 and a receiver 32. The transmitter 31 is electrically connected to the power supply unit 40 to effect wireless transmission of electrical power and the receiver 32 is electrically connected to the power supply unit 40 to effect wireless receipt of electrical power. Further, the first signal control terminal 101 of the first transfer unit 10 is electrically connected to the selector 30 so that the selector 30 switches the operation of the first transfer unit 10 between the transmitter 31 and the receiver 32. The second transfer unit 20 comprises a transmitter 31 and a receiver 32. The transmitter 31 is electrically connected to the power supply unit 40 to effect wireless transmission of electrical power and the receiver 32 is electrically connected to the power supply unit 40 to effect wireless receipt of electrical power. Further, the second signal control terminal 201 of the second transfer unit 32 is electrically connected to the selector 30, so that the selector 30 switches the operation of the second transfer unit 32 between the transmitter 31 and the receiver 32.

Figure 2:
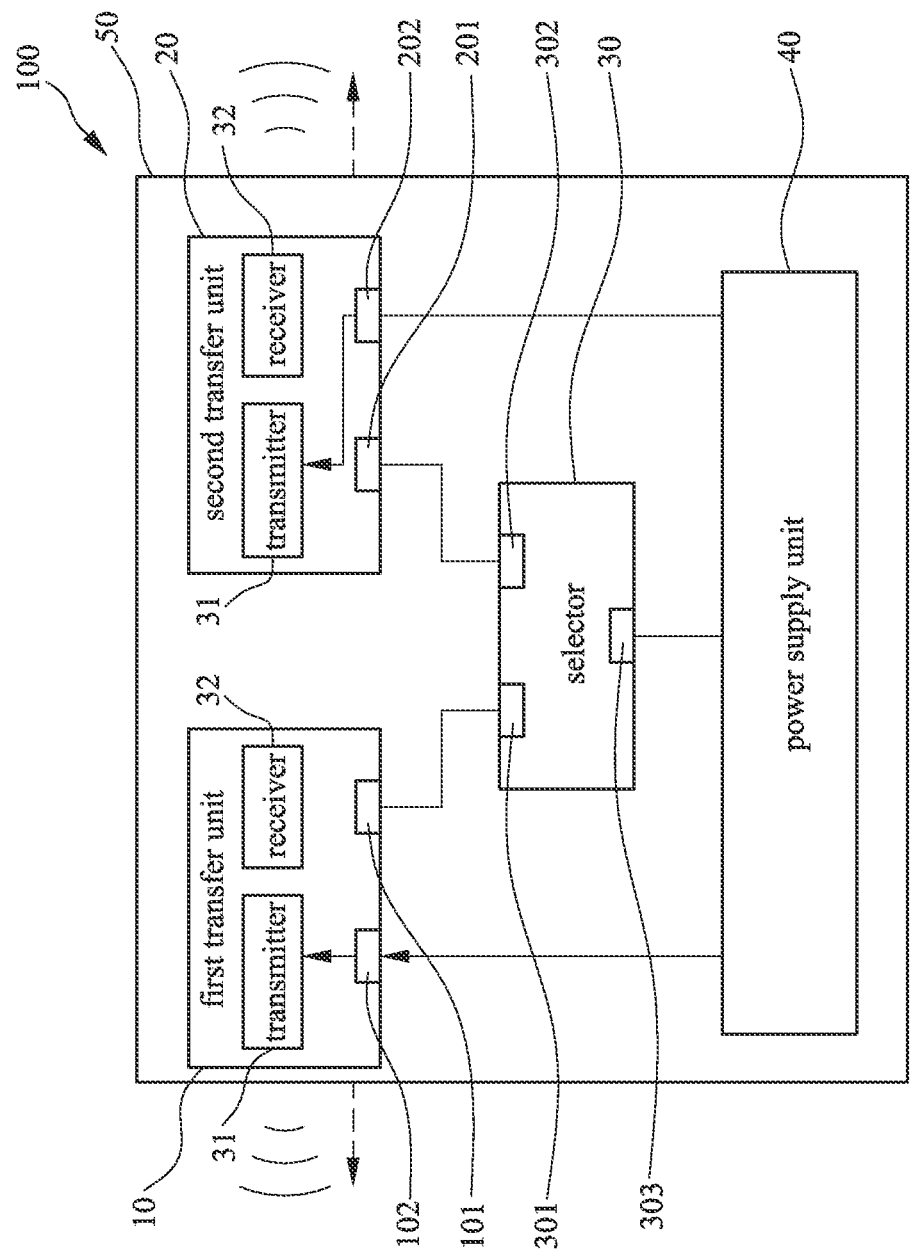
FIG. 2 is a block diagram illustrating a first operation condition of the present invention.

In a first condition of operation of the present invention (also see FIG. 2), the selector 30 switches the first transfer unit 10 to the operation of the transmitter 31 and the second transfer unit 20 is also switched by the selector 30 to the operation of the transmitter 31 so as to form a first power transfer device 100 (also see FIG. 2). The first transfer unit 10 and the second transfer unit 20 of the first power transfer device 100 are respectively and electrically connected to the power supply unit 40 to allow the first transfer unit 10 and the second transfer unit 20 to respectively carry out transfer operations for wireless transmission of electrical power.

Figure 3:
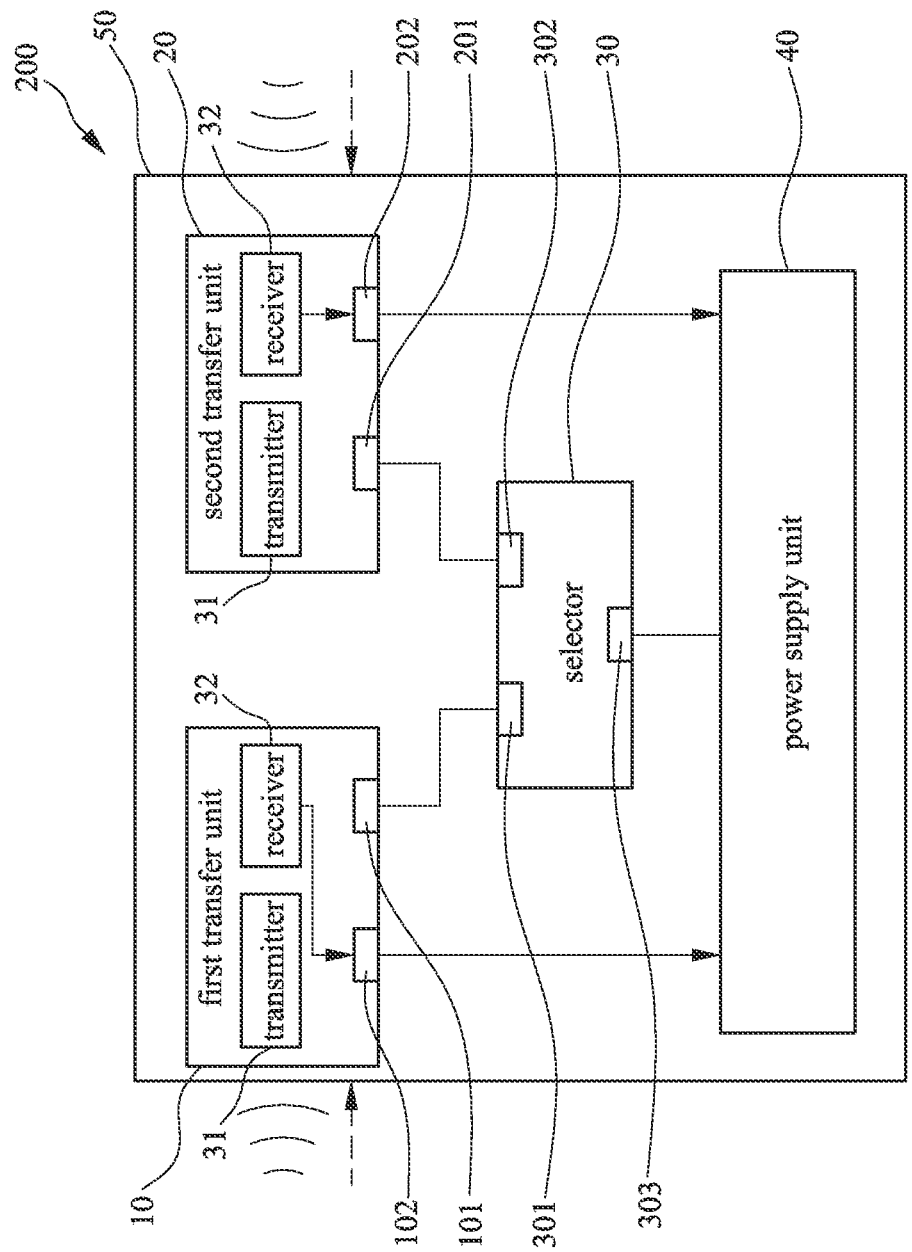
FIG. 3 is a block diagram illustrating a second operation condition of the present invention.

In a second condition of operation of the present invention (also see FIG. 3), the selector 30 switches the first transfer unit 10 to the operation of the receiver 32 and the second transfer unit 20 is also switched by the selector 30 to the operation of the receiver 32 so as to form a second power transfer device 200 (also see FIG. 3). The first transfer unit 10 and the second transfer unit 20 of the second power transfer device 200 are respectively and electrically connected to the power supply unit 40 to allow the first transfer unit 10 and the second transfer unit 20 to respectively carry out transfer operations for wireless receipt of electrical power.

Figure 4:
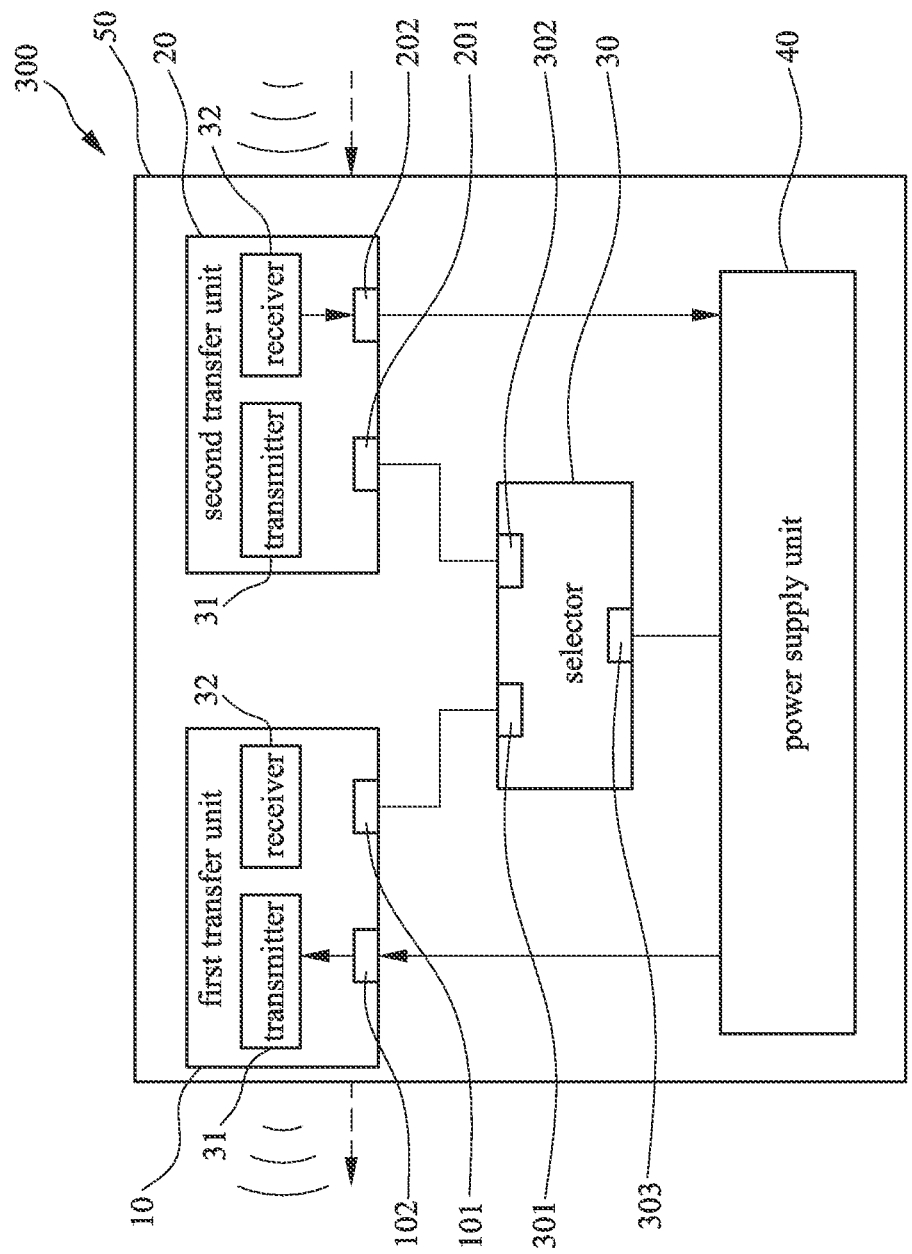
FIG. 4 is a block diagram illustrating a third operation condition of the present invention.

In a third condition of operation of the present invention (also see FIG. 4), the selector 30 switches the first transfer unit 10 to the operation of the transmitter 31 and the second transfer unit 20 is also switched by the selector 30 to the operation of the receiver 32 so as to form a third power transfer device 300 (also see FIG. 4). The first transfer unit 10 and the second transfer unit 20 of the third power transfer device 300 are respectively and electrically connected to the power supply unit 40 to allow the first transfer unit 10 and the second transfer unit 20 to respectively carry out transfer operations for wireless transmission and wireless receipt of electrical power.

Figure 5:
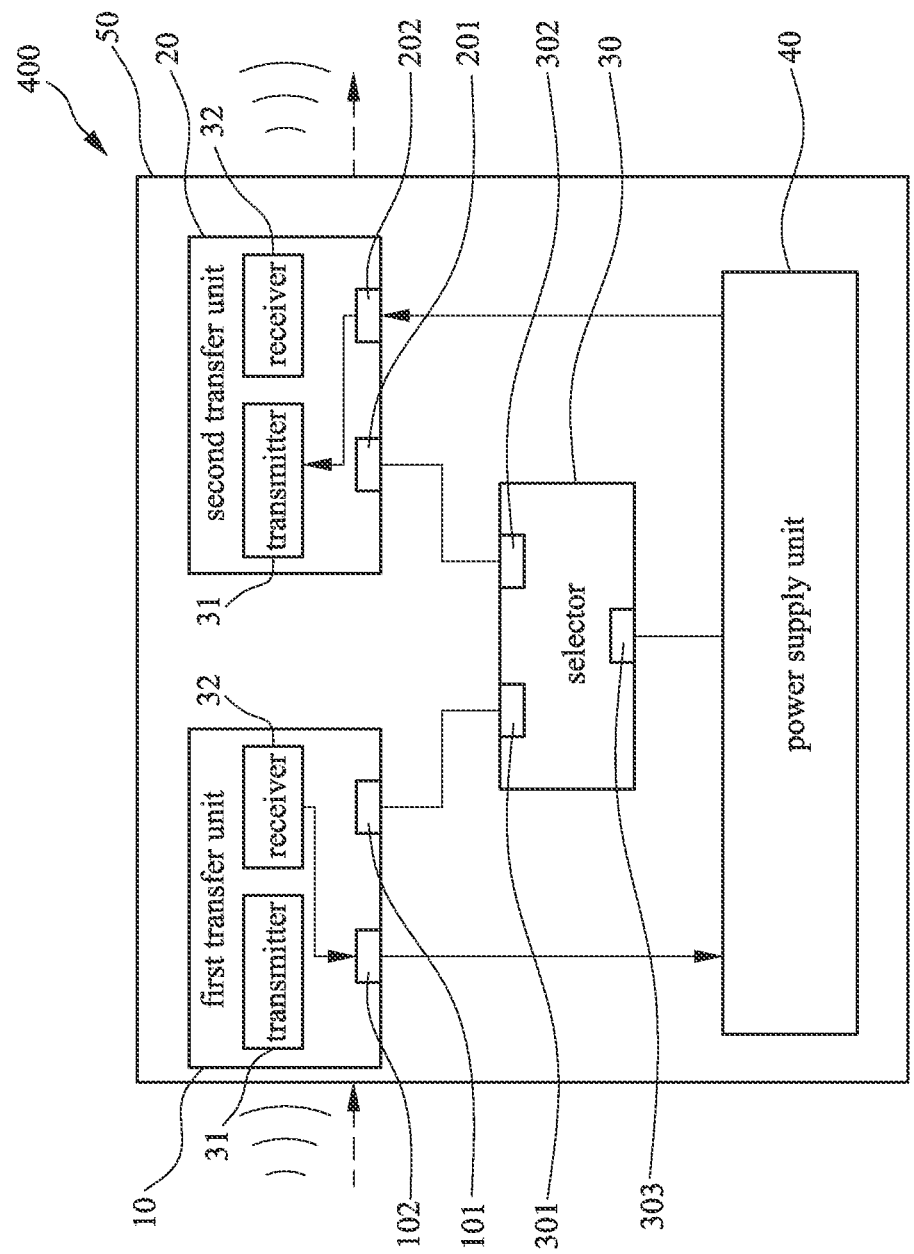
FIG. 5 is a block diagram illustrating a fourth operation condition of the present invention.

In a fourth condition of operation of the present invention (also see FIG. 5), the selector 30 switches the first transfer unit 10 to the operation of the receiver 32 and the second transfer unit 20 is also switched by the selector 30 to the operation of the transmitter 31 so as to form a fourth power transfer device 400 (also see FIG. 5). The first transfer unit 10 and the second transfer unit 20 of the fourth power transfer device 400 are respectively and electrically connected to the power supply unit 40 to allow the first transfer unit 10 and the second transfer unit 20 to respectively carry out transfer operations for wireless receipt and wireless transmission of electrical power.

Figure 6:
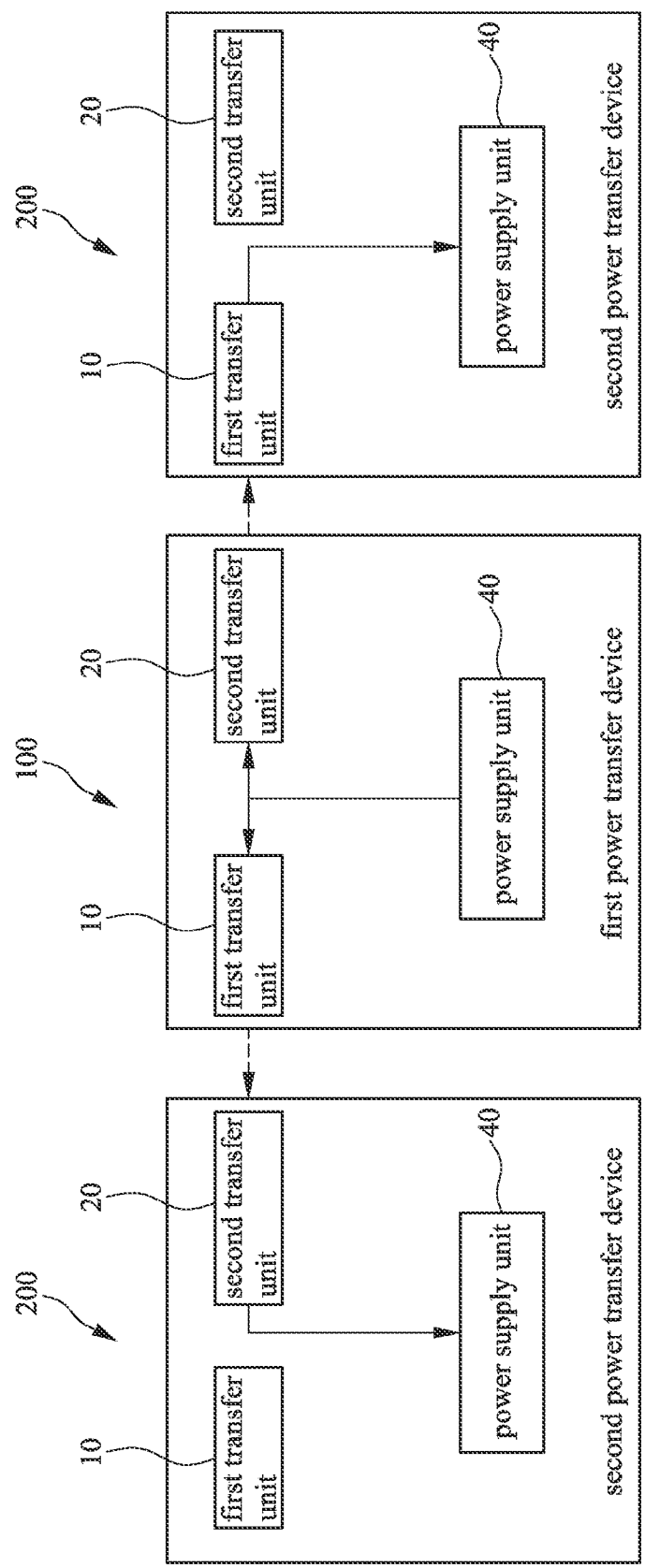
FIG. 6 is a block diagram illustrating a first example of wireless power transfer according to the present invention.

Referring to FIG. 6, which is a block diagram illustrating a first example of wireless power transfer according to the present invention, reference being also had to FIGS. 2 and 3, since most of the components of FIGS. 2 and 3 are identical to those of FIG. 6, repeated description will be omitted herein. A first power transfer device 100 (also see FIG. 2) is set to be in wireless connection with second power transfer devices 200 (also see FIG. 3) in series/parallel. The first power transfer device 100 controls the first transfer unit 10 and the second transfer unit 20 thereof to respectively carry out transfer operations of wireless transmission of electrical power, while the second power transfer devices 200 control the first transfer units 10 and the second transfer units 20 thereof to respectively carry out transfer operations of wireless receipt of electrical power. In this way, the first power transfer device 100 transmits electrical power, in a wireless manner, to a plurality of second power transfer devices 200 so as to achieve wireless power transfer for multiple bidirectional wireless power transfer devices through electrical connection in series/parallel.

Figure 7:
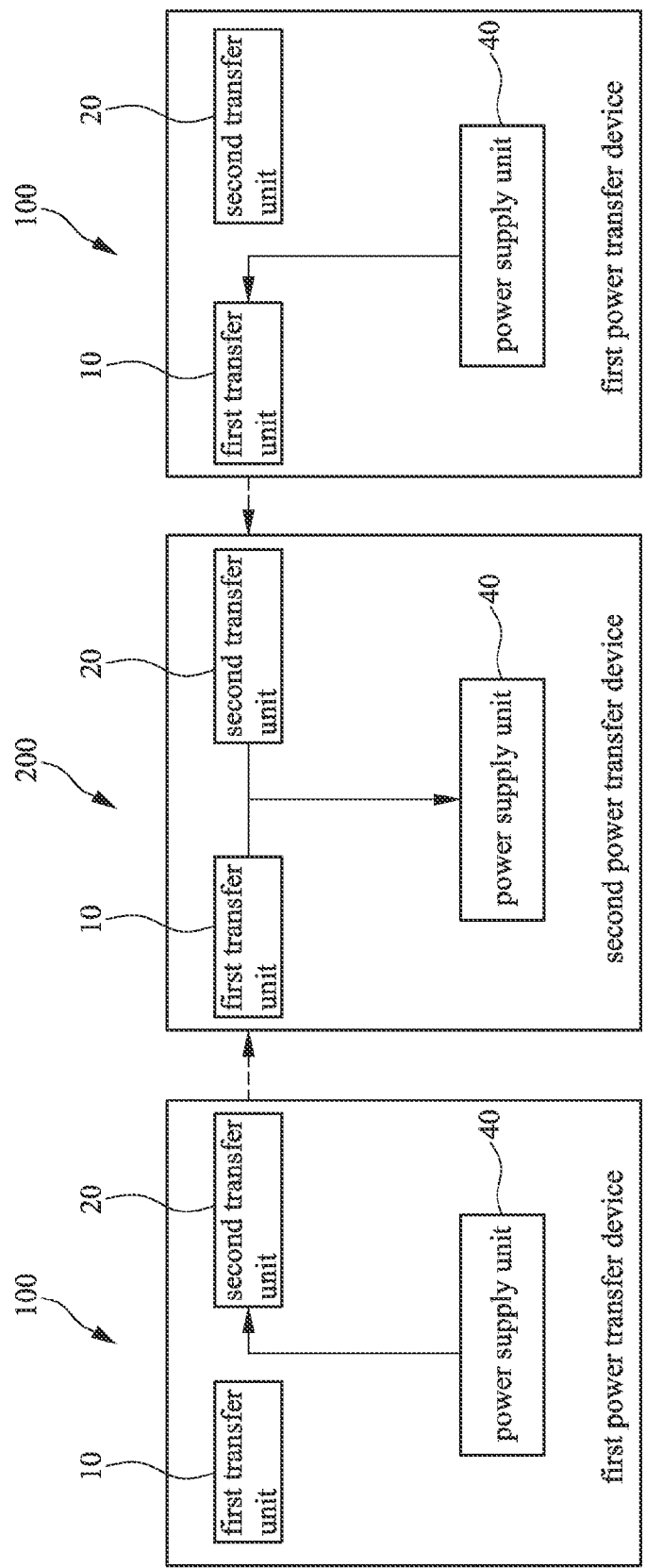
FIG. 7 is a block diagram illustrating a second example of wireless power transfer according to the present invention.

Referring to FIG. 7, which is a block diagram illustrating a second example of wireless power transfer according to the present invention, reference being also had to FIGS. 2 and 3, since most of the components of FIGS. 2 and 3 are identical to those of FIG. 7, repeated description will be omitted herein. First power transfer devices 100 (also see FIG. 2) are set to be in wireless connection with a second power transfer device 200 (also see FIG. 3) in series/parallel. The first power transfer devices 100 control the first transfer units 10 and the second transfer units 20 thereof to respectively carry out transfer operations of wireless transmission of electrical power, while the second power transfer device 200 controls the first transfer unit 10 and the second transfer unit 20 thereof to respectively carry out transfer operations of wireless receipt of electrical power. In this way, a plurality of first power transfer devices 100 transmits electrical power, in a wireless manner, to a second power transfer device 200 to allow the second power transfer device 200 to wirelessly receive electrical power, so as to achieve wireless power transfer for multiple bidirectional wireless power transfer devices through electrical connection in series/parallel.

Figure 8:
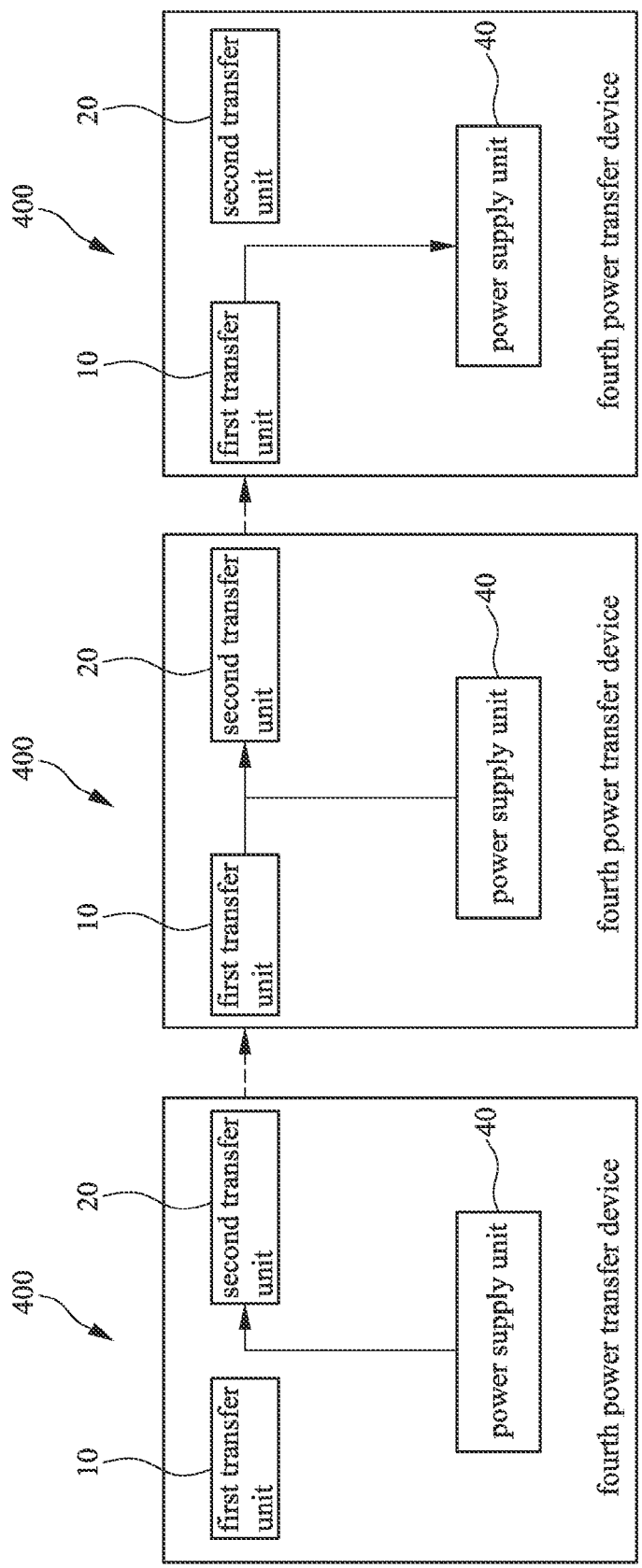
FIG. 8 is a block diagram illustrating a third example of wireless power transfer according to the present invention.

Referring to FIG. 8, which is a block diagram illustrating a third example of wireless power transfer according to the present invention, reference being also had to FIG. 5, since most of the components of FIG. 5 are identical to those of FIG. 8, repeated description will be omitted herein. FIG. 8 shows a plurality of fourth power transfer devices 400 (also see FIG. 5) that are electrically connected in series/parallel in a wireless manner. The plurality of fourth power transfer devices 400 controls the first transfer units 10 and the second transfer units 20 thereof to respectively carry out transfer operations of wireless receipt and wireless transmission. In this way, a plurality of fourth power transfer devices 400 transmits electrical power, in a wireless manner, through electrical connection in series/parallel and also effects simultaneous bidirectional power transmission.

The features of the present invention are as follows:

A first transfer unit and a second transfer unit each comprise a transmitter and a receiver. The first transfer unit and the second transfer unit are selectively switched between operations of the transmitter and the receiver so as to effect bidirectional transfer (transmitting/receiving) of electrical power in a wireless manner.

A plurality of bidirectional wireless power transfer devices can be electrically connected in series/parallel to carry out transfer of electrical power and effect simultaneous wireless bidirectional transfer (transmitting/receiving) of electrical power.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A bidirectional wireless power transfer device, comprising:
    a first transfer unit, which comprises a first signal control terminal and a first power transfer terminal;
    a second transfer unit, which comprises a second signal control terminal and a second power transfer terminal;
    a selector, which comprises a first signal terminal, a second signal terminal, and a power input terminal, the first signal terminal being electrically connected to the first transfer unit, the second signal terminal being electrically connected to the second transfer unit;
    a power supply unit, which is electrically connected to the power input terminal of the selector and is electrically connected to the first power transfer terminal and the second power transfer terminal; and
    a circuit board, on which the first transfer unit, the second transfer unit, the selector, and the power supply unit are mounted.

2. The bidirectional wireless power transfer device as claimed in claim 1, wherein the first transfer unit comprises a transmitter and a receiver, the transmitter being electrically connected to the power supply unit to effect wireless transmission of electrical power, the receiver being electrically connected to the power supply unit to effect wireless receipt of electrical power, the first signal control terminal of the first transfer unit being electrically connected to the selector, the selector selectively switching the first transfer unit between the transmitter and the receiver.

3. The bidirectional wireless power transfer device as claimed in claim 1, wherein the second transfer unit comprises a transmitters and a receivers, the transmitter being electrically connected to the power supply unit to effect wireless transmission of electrical power, the receiver being electrically connected to the power supply unit to effect wireless receipt of electrical power, the second signal control terminal of the second transfer unit being electrically connected to the selector, the selector selectively switching the second transfer unit between the transmitter and the receiver.

4. The bidirectional wireless power transfer device as claimed in claim 1, wherein the power supply unit comprises an electrical cell.

5. The bidirectional wireless power transfer device as claimed in claim 2, wherein the power supply unit comprises an electrical cell.

6. The bidirectional wireless power transfer device as claimed in claim 3, wherein the power supply unit comprises an electrical cell.

7. The bidirectional wireless power transfer device as claimed in claim 4, wherein the electrical cell comprises one of an ultra-thin cell, a flexible cell, a nickel-cadmium cell, a nickel hydride cell, and a lithium ion cell.

8. The bidirectional wireless power transfer device as claimed in claim 5, wherein the electrical cell comprises one of an ultra-thin cell, a flexible cell, a nickel-cadmium cell, a nickel hydride cell, and a lithium ion cell.

9. The bidirectional wireless power transfer device as claimed in claim 6, wherein the electrical cell comprises one of an ultra-thin cell, a flexible cell, a nickel-cadmium cell, a nickel hydride cell, and a lithium ion cell.

* * * * *